US010821377B2

(12) United States Patent
Sasaki et al.

(10) Patent No.: US 10,821,377 B2
(45) Date of Patent: Nov. 3, 2020

(54) FILTER DEVICE

(71) Applicant: YAMASHIN-FILTER CORP., Kanagawa (JP)

(72) Inventors: Nobuki Sasaki, Kanagawa (JP); Nobuyuki Kitajima, Kanagawa (JP); Yoshinori Tsurusaki, Kanagawa (JP)

(73) Assignee: YAMASHIN-FILTER CORP., Kanagawa (JP)

( * ) Notice: Subject to any disclaimer, the term of this patent is extended or adjusted under 35 U.S.C. 154(b) by 0 days.

(21) Appl. No.: 16/210,030

(22) Filed: Dec. 5, 2018

(65) Prior Publication Data
US 2019/0105584 A1 Apr. 11, 2019

Related U.S. Application Data

(63) Continuation of application No. PCT/JP2017/022559, filed on Jun. 19, 2017.

(30) Foreign Application Priority Data

Jun. 29, 2016 (JP) .................................. 2016-129087

(51) Int. Cl.
*B01D 19/00* (2006.01)
*F15B 1/26* (2006.01)
(Continued)

(52) U.S. Cl.
CPC ......... *B01D 19/0031* (2013.01); *B01D 19/00* (2013.01); *B01D 24/00* (2013.01);
(Continued)

(58) Field of Classification Search
None
See application file for complete search history.

(56) References Cited

U.S. PATENT DOCUMENTS 2,111,473 A * 3/1938 Hudson ............... F16K 17/19
    137/202
3,969,092 A * 7/1976 Huffman ............ B01D 19/0063
    96/164
(Continued)

FOREIGN PATENT DOCUMENTS

CN          1662740 A        8/2005
CN        204921550 U       12/2015
(Continued)

OTHER PUBLICATIONS

Translation of JP2017080653A, accessed Jan. 30, 2020 (Year: 2015).*
(Continued)

*Primary Examiner* — Christopher P Jones
*Assistant Examiner* — Phillip Y Shao
(74) *Attorney, Agent, or Firm* — Nakanishi IP Associates, LLC

(57) ABSTRACT

An air vent hole includes a substantially columnar hole main body portion, a first hole portion formed on the upper side of the hole main body portion, and a second hole portion formed on the lower side of the hole main body portion. Each of the first hole portion and the second hole portion partly has, in a cross section of the hole portion substantially orthogonal to a first direction that is a longitudinal direction of the hole main body portion, a cross-sectional area smaller than a cross-sectional area of a cross section of the hole main body portion substantially orthogonal to the first direction. A float inserted into the air vent hole is movable between a position where the float occludes the first hole portion and a position where the float occludes the second hole portion. The float occludes the first hole portion under the weight of the float. However, the float is pushed up by air. Furthermore, the float is formed of a material having a smaller (Continued)

specific gravity than a liquid to be filtered. Thus, the float is pushed up by the liquid to occlude the first hole portion.

8 Claims, 10 Drawing Sheets

(51) Int. Cl.
    *F16K 24/04*     (2006.01)
    *F15B 21/04*     (2019.01)
    *B01D 36/00*     (2006.01)
    *B01D 29/90*     (2006.01)
    *B01D 35/147*     (2006.01)
    *B01D 29/21*     (2006.01)
    *B01D 24/00*     (2006.01)
    *B01D 29/01*     (2006.01)
    *B01D 29/00*     (2006.01)
    *B01D 29/88*     (2006.01)

(52) U.S. Cl.
    CPC ......... *B01D 29/0029* (2013.01); *B01D 29/01* (2013.01); *B01D 29/21* (2013.01); *B01D 29/908* (2013.01); *B01D 35/147* (2013.01); *B01D 36/001* (2013.01); *F15B 1/26* (2013.01); *F15B 21/04* (2013.01); *F16K 24/04* (2013.01); *F16K 24/042* (2013.01); *B01D 29/88* (2013.01); *B01D 2201/64* (2013.01)

(56) References Cited

U.S. PATENT DOCUMENTS

| | | | | |
|---|---|---|---|---|
| 4,901,754 A * | 2/1990 | Sable | .................. | B01D 36/001 137/433 |
| 5,213,586 A * | 5/1993 | Welker | .................. | C10L 3/006 137/202 |
| 6,840,262 B2 * | 1/2005 | Kojima | .................. | F16K 17/19 137/202 |
| 8,177,975 B2 * | 5/2012 | Schipper | ............ | B01D 19/0005 210/323.2 |
| 8,371,271 B2 * | 2/2013 | Achor | ................ | F02M 25/0836 123/516 |
| 2005/0081831 A1 | 4/2005 | Larsson | | |
| 2010/0163479 A1 | 7/2010 | Kim et al. | | |
| 2013/0319548 A1 | 12/2013 | Hamza et al. | | |
| 2018/0147511 A1 * | 5/2018 | Kitajima | ................ | B01D 29/21 |

FOREIGN PATENT DOCUMENTS

| | | |
|---|---|---|
| DE | 4014551 C1 | 12/1991 |
| EP | 2204506 A2 | 7/2010 |
| JP | S63-93625 A | 4/1988 |
| JP | 2006-046142 A | 2/2006 |
| JP | 2007-010631 A | 1/2007 |
| JP | 2017-80653 A | 5/2017 |

OTHER PUBLICATIONS

International Search Report issued in PCT/JP2017/022559 dated Aug. 8, 2017 with English Translation (3 pages).
First Office Action issued in Chinese Patent Application No. 201780038206.5 dated Nov. 28, 2019, with English Translation (15 pages).
Second Office Action issued in Chinese Patent Application No. 201780038206.5 dated Jun. 24, 2020, with English Translation (16 pages).
European Office Action issued in European Patent Application No. 17819939.4, dated Apr. 29, 2020 (5 pages).
Extended European Search Report issued in European Patent Application No. 17819939.4, dated May 20, 2019 (7 pages).

* cited by examiner

US 10,821,377 B2

FILTER DEVICE

CROSS-REFERENCE TO RELATED APPLICATIONS

This application is a continuation application of International Patent Application No. PCT/JP2017/022559 filed on Jun. 19, 2017, which claims priority to Japanese Patent Application No. 2016-129087 filed on Jun. 29, 2016, the entire contents of which are incorporated by reference.

TECHNICAL FIELD

The present invention relates to a filter device.

BACKGROUND ART

Patent Document 1 discloses a filter including a filter case provided with an air vent hole equipped with a float floatable on a liquid and moving up or down according to a height of a liquid surface in an inflow space, the filter case being further provided with an air reservoir portion containing air sealed in the inflow space while an opening of the air vent hole is occluded by the float. An increased amount of air trapped in the air reservoir portion lowers the liquid surface to separate the float from the opening to cause a portion of the air in the air reservoir portion to be released through the air vent hole.

CITATION LIST

Patent Document

Patent Document 1: JP 2006-046142 A

However, in the invention described in Patent Document 1, when an engine is stopped, air may flow back into the filter through the air vent hole.

In view of these circumstances, an object of the present invention is to provide a filter device capable of discharging air trapped in the filter device and preventing outflow of a liquid from the filter device through the air vent hole or backward flow of air through the air vent hole.

SUMMARY OF INVENTION

In one or more embodiments of the present invention, a filter case includes a substantially cylindrical side surface member, a bottom surface member covering a lower end of the side surface member, and a lid member covering an upper end of the side surface member, the filter case being internally provided with a substantially cylindrical interior space, and an air vent portion provided in the lid member. The air vent portion includes an air vent hole allowing the interior space to communicate with an exterior space of the filter case and including a substantially columnar hole main body portion, a first hole portion formed on the upper side of the hole main body portion and partly having, in a cross section of the first hole portion substantially orthogonal to a first direction that is a longitudinal direction of the hole main body portion, a cross-sectional area smaller than a cross-sectional area of a cross section of the hole main body portion substantially orthogonal to the first direction, and a second hole portion formed on the lower side of the hole main body portion and partly having, in a cross section of the second hole portion substantially orthogonal to the first direction, a cross-sectional area smaller than the cross-sectional area of the cross section of the hole main body portion substantially orthogonal to the first direction; and float inserted into the air vent hole to be movable between a position where the float occlude the first hole portion and a position where the float occludes the second hole portion, the float being formed of a material having a smaller specific gravity than a liquid to be filtered.

In the filter device according to one or more embodiments of the present invention, the air vent hole includes the substantially columnar hole main body portion, the first hole portion formed on the upper side of the hole main body portion, and the second hole portion formed on the lower side of the hole main body portion. Each of the first hole portion and the second hole portion partly has, in the cross section of the hole portion substantially orthogonal to the first direction that is the longitudinal direction of the hole main body portion, a cross-sectional area smaller than the cross-sectional area of the cross section of the hole main body portion substantially orthogonal to the first direction. The float inserted into the air vent hole is movable between the position where the float occludes the first hole portion and the position where the float occludes the second hole portion. The float occludes the second hole portion under the weight of the float. However, the float is pushed up by air to allow the air trapped inside the filter device to be discharged through the air vent hole. The float also occludes the second hole portion to allow air to be prevented from flowing backward through the air vent hole. Moreover, the float is formed of the material having a smaller specific gravity than the liquid to be filtered. The float is thus pushed up by the liquid to occlude the first hole portion to allow the liquid to be prevented from leaking through the air vent hole.

Here, the first hole portion may be a first tapered hole portion formed to have a diameter gradually decreasing upward, and the second hole portion may be a second tapered hole portion formed to have a diameter gradually decreasing downward. The float may have a substantially spherical shape having a diameter that is smaller than a diameter of the cross section of the hole main body portion substantially orthogonal to the longitudinal direction and that is larger than a diameter of a thinnest section of the first tapered hole portion and a diameter of a thinnest section of the second tapered hole portion. The float may be inserted into a space formed by the hole main body, the first tapered hole portion, and the second tapered hole portion. The first tapered hole portion or the second tapered hole portion comes into abutting contact with the float along an annular line to allow the float to firmly occlude the first tapered hole portion or the second tapered hole portion.

Here, each of the first hole portion and the second hole portion may be a substantially columnar hole having, in the cross section of the hole portion substantially orthogonal to the first direction, a cross-sectional area smaller than the cross-sectional area of the cross section of the hole main body portion substantially orthogonal to the first direction. The float may include a plate-shaped portion having a diameter that is smaller than the diameter of the cross section of the hole main body portion substantially orthogonal to the first direction and that is larger than the diameter of the cross section of the first hole portion substantially orthogonal to the first direction and the diameter of the cross section of the second hole portion substantially orthogonal to the first direction, a first protruding portion formed on the upper side of the plate-shaped portion and having a diameter smaller than the diameter of the cross section of the first hole portion substantially orthogonal to the first direction, and a second protruding portion formed on the lower side of the plate-shaped portion and having a diameter smaller than the diameter of the cross section of the second hole portion substantially orthogonal to the first direction. This allows the shape of the air vent hole to be simplified.

Here, the side surface member may include an inflow hole formed in a vicinity of the lid member to cause the liquid to flow from a tangential direction at any point on a side surface of the filter case into the filter case. The air vent portion may be provided at a position including a center axis of the interior space. Thus, a swirling flow is caused in the liquid and resultant bubbles are collected in the center of the swirling flow to allow air contained in the liquid to be efficiently removed. In particular, since the inflow hole is formed in the vicinity of the lid member, the bubbles are allowed to quickly reach an oil surface, i.e., the interior space.

Here, the air vent portion may include a lower end surface positioned above a lower surface of the lid member. This allows the float to be easily pushed up by air trapped in an upper section of the interior space.

Here, a step recessed outward in a radial direction may be formed in the first tapered hole portion. Thus, when the oil surface lowers, the float may be allowed to follow the oil surface to be separated from the first tapered hole portion.

Here, the first hole portion may include a chamfer or a step formed at a lower end of the first hole portion, the step being recessed outward in the radial direction. Thus, when the oil surface lowers, the float may be allowed to follow the oil surface to be separated from the upper end of the hole main body portion.

According to one or more embodiments of the present invention, air trapped in the filter device can be discharged, and outflow of the liquid from the filter device through the air vent hole or backward flow of air through the air vent hole can be prevented.

DESCRIPTION OF EMBODIMENTS

Below, detailed description of embodiments of the present invention will be given with reference to the drawings. A filter device according to the present invention will be described below taking, as an example, a return filter provided inside a hydraulic oil tank. The hydraulic oil tank is a tank installed in a hydraulic apparatus such as a work machine to reserve hydraulic oil used for the hydraulic apparatus. Note that the present invention is applicable to various filter devices other than return filters.

First Embodiment

Figure 1:
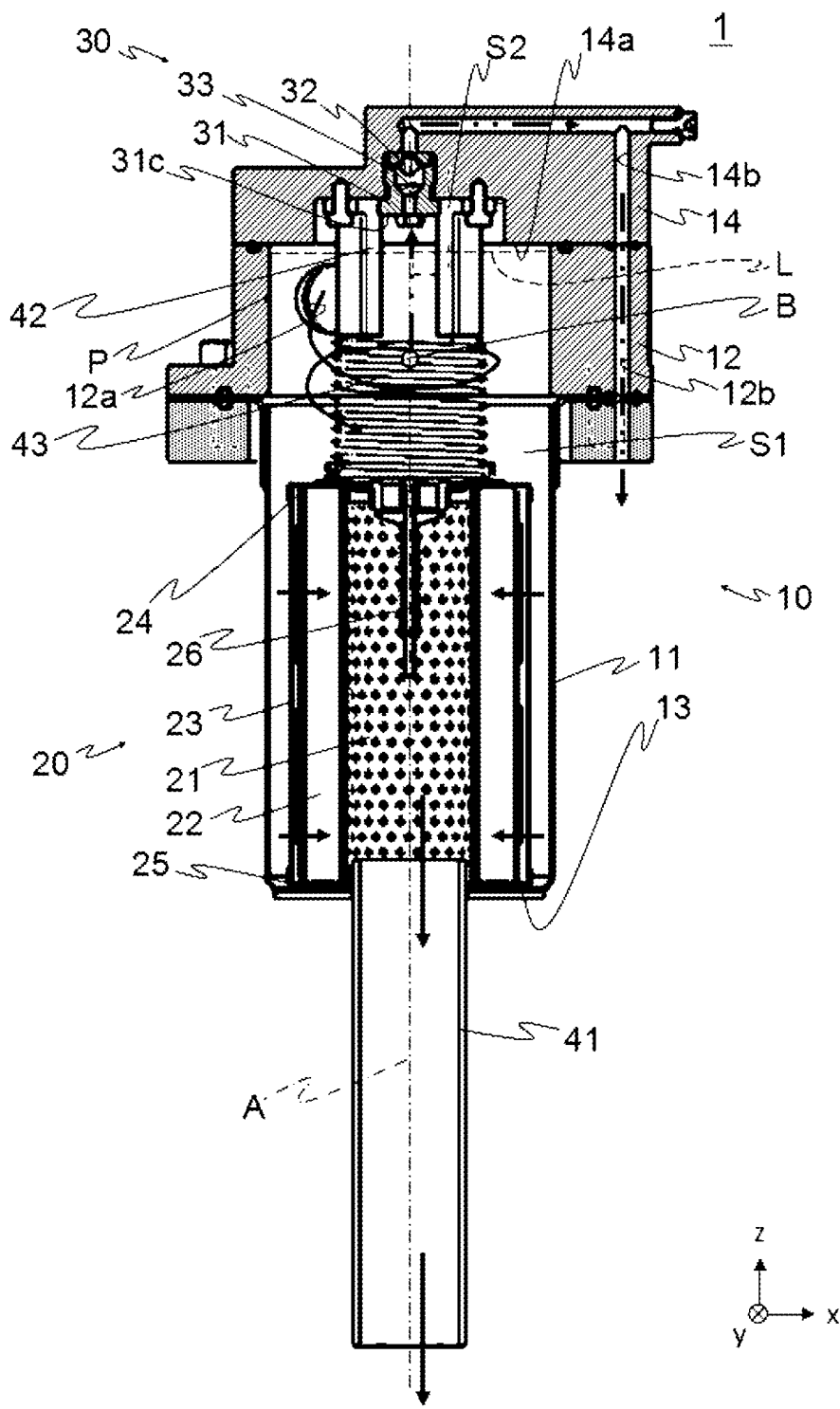
FIG. 1 is a cross-sectional view schematically illustrating a return filter 1.

FIG. 1 is a cross-sectional view schematically illustrating a return filter 1 (hatching illustrating a cross section is partly omitted). The return filter 1 mainly includes a filter case 10, a filter element 20, and an air vent portion 30.

The filter case 10 as a whole is substantially cylindrical and is formed of a very corrosion-resistive material (e.g., metal such as stainless steel or resin).

The filter case 10 is provided with a first tubular case 11 having a substantially cylindrical shape, a second tubular case 12 provided on the upper side of the first tubular case 11 and having a substantially cylindrical shape, a bottom surface member 13 covering a lower end of the first tubular case 11, and a lid member 14 covering an upper end of the second tubular case 12. The first tubular case 11 and the bottom surface member 13 are provided inside the tank. The second tubular case 12 and the lid member 14 are provided outside the tank.

The first tubular case 11 and the second tubular case 12 constitute a substantially cylindrical side surface member. A lower end surface of the side surface member is covered by the bottom surface member 13. An upper end surface of the side surface member is covered by the lid member 14. This allows a substantially cylindrical interior space S1 to be formed inside the filter case 10. A filter element 20 and the like are provided in the interior space S1.

The filter element 20 mainly includes an inner tube 21, a filtration material 22, an outer tube 23, plates 24 and 25, and a valve 26.

The inner tube 21, the filtration material 22, and the outer tube 23 are each a substantially hollow cylindrical member with an opening at both ends of the cylindrical member. Each of the inner tube 21 and the outer tube 23 is formed of a very corrosion-resistive material (e.g., metal such as stainless steel or resin), and includes holes formed substantially all over the tube and through which hydraulic oil passes. Note that the outer tube 23 is optional.

The filtration material 22 is configured to filter hydraulic oil and has a substantially cylindrical shape with a thickness in a radial direction. The filtration material 22 has a height substantially equal to the height of each of the inner tube 21 and the outer tube 23. The filtration material 22 is formed by pleating filter paper formed of a synthetic resin, paper, or the like and joining opposite ends of the pleated filter paper together to shape the filter paper into a cylinder.

Each of the plate 24 and the plate 25 is a member with a substantially circular plate shape or a bottomed substantially cylindrical shape and is formed of resin or metal. The plate 24 and the plate 25 are provided to cover ends (openings) of the inner tube 21, the filtration material 22, and the outer tube 23. The plate 24 covers upper ends of the inner tube 21, the filtration material 22, and the outer tube 23, and the plate 25 covers lower ends of the inner tube 21, the filtration material 22, and the outer tube 23.

The plate 24 is provided with a valve 26. The valve 26 is opened and closed depending on a difference between a pressure inside the filter element 20 and a pressure between the filter case 10 and the filter element 20 (the pressure outside the filter element 20).

The filter case 10 will be described again. The second tubular case 12 is provided with an inflow hole 12a to which an inflow pipe not illustrated in the drawings is attached. The inflow pipe allows oil to flow into the interior space S1 from a tangential direction at any point P on a side surface of the second tubular case 12. In the example illustrated in FIG. 1, oil flows in from the +y direction toward the −y direction. As a result, the hydraulic oil having flowed in through the inflow hole 12a flows through the interior space S1 from an outer periphery toward an inner side of the interior space S1 while swirling. When a swirling flow thus occurs in the hydraulic oil, small bubbles included in the hydraulic oil are collected in a center portion of the swirling flow to generate large bubbles B.

The inflow hole 12a is provided in the vicinity of the lid member 14. The bubbles B are therefore generated in the vicinity of the lid member 14, i.e., in the vicinity of an oil surface L.

The bottom surface member 13 is provided with a substantially cylindrical outflow pipe 41 communicating with a hollow section of the filter element 20. A seal between an outer peripheral surface of the outflow pipe 41 and an inner peripheral surface of the filter element 20 is created by a seal member such as a gasket.

The lid member 14 is provided with an attachment member 42 and an air vent portion 30. The attachment member 42 is a substantially cylindrical member including a plurality of slots formed on a side surface of the member and extending in a longitudinal direction. The attachment member 42 is a component used to attach the filter element 20 into the interior space S1 via an elastic member 43.

The elastic member 43 is provided between the attachment member 42 and the plate 24. The elastic member 43 is, e.g., a coil spring that presses the plate 24, i.e., the filter element 20 downward (−z direction). As a result, the plate 25 is pressed against the bottom surface member 13 to install the filter element 20 inside the interior space S1.

The air vent portion 30 is provided in the vicinity of the center of the lid member 14, i.e., at a position including a center axis A of the internal space S1. The air vent portion 30 includes a main body portion 31 provided with an air vent hole 33, and a float 32.

Figure 2:
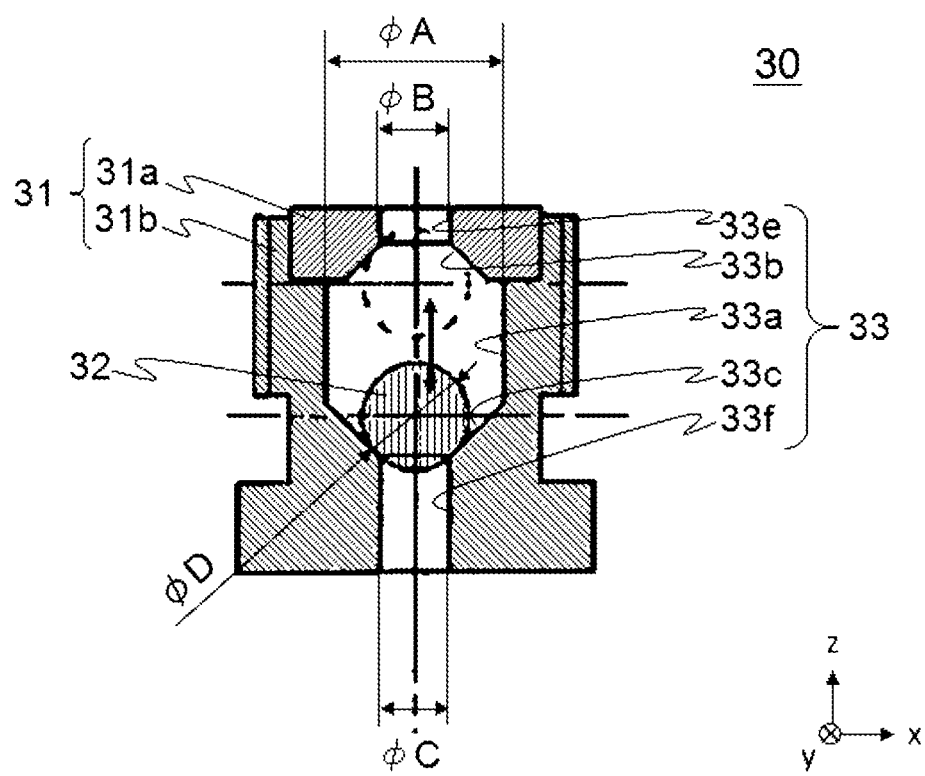
FIG. 2 is a cross-sectional view illustrating details of an air vent portion 30.

FIG. 2 is a cross-sectional view illustrating details of the air vent portion 30. The main body portion 31 is a substantially cylindrical component formed by integrating two components 31a and 31b together to form the air vent hole 33.

The air vent hole 33 includes a hole main body portion 33a, a first tapered hole portion 33b, and a second tapered hole portion 33c. The hole main body portion 33a is a substantially columnar hole having a diameter $\phi A$ in a cross section of the hole substantially orthogonal to the longitudinal direction. The first tapered hole portion 33b is formed on the upper side of (on a +z side of) the hole main body portion 33a to have a diameter gradually decreasing upward (in an +z direction). The second tapered hole portion 33c is formed on the lower side of (on a −z side of) the hole main body portion 33a to have a diameter gradually decreasing downward (in an −z direction). When the thinnest section of the first tapered hole portion 33b is assumed to have a diameter $\phi B$ and the thinnest section of the second tapered hole portion 33c is assumed to have a diameter $\phi C$, $\phi A > \phi B$ and $\phi A > \phi C$. That is, each of the first tapered hole portion 33b and the second tapered hole portion 33c partly has, in a cross section of the hole portion substantially orthogonal to the z direction (the longitudinal direction of the hole main body portion 33a), a cross-sectional area smaller than the cross-sectional area of the hole main body portion 33a in a cross section of the hole main body portion 33a substantially orthogonal to the z direction.

Note that, in the present embodiment, a taper angle of the first tapered hole portion 33b is substantially identical to a taper angle of the second tapered hole portion 33c and $\phi B = \phi C$, but the taper angle of the first tapered hole portion 33b may be different from the taper angle of the second tapered hole portion 33c or $\phi B$ may be different from $\phi C$. Furthermore, in the present embodiment, the diameter of the thickest section of the first tapered hole portion 33b is smaller than $\phi A$ and the diameter of the thickest section of the second tapered hole portion 33c is substantially identical to $\phi A$. However, the diameter of the thickest section of the first tapered hole portion 33b or the second tapered hole portion 33c may be larger than $\phi A$.

A substantially columnar hole 33e having the diameter $\phi B$ is formed on the upper side of the first tapered hole portion 33b, and a substantially columnar hole 33f having the diameter $\phi C$ is formed on the lower side of the second tapered hole portion 33c. Note that the holes 33e and 33f are optional. Furthermore, the holes 33e and 33f may have an identical diameter or different diameters.

The float 32 is inserted into the air vent hole 33, specifically, into a space formed by the hole main body portion 33a, the first tapered hole portion 33b, and the second tapered hole portion 33c. The float 32 is of a substantially spherical shape. When the float 32 is assumed to have a diameter $\phi D$, $\phi A > \phi D$, $\phi D > \phi B$, and $\phi D > \phi C$. In other words, the diameter of the float 32 is smaller than the diameter of the hole main body portion 33a and is larger than the diameter of the thinnest section of each of the first tapered hole portion 33b and the second tapered hole portion 33c.

The float 32 is therefore capable of moving in an up-down direction (z direction) between a position where the float comes into abutting contact with an upper end of the first tapered hole portion 33b (see a dashed line in FIG. 2) and a position where the float comes into abutting contact with a lower end of the second tapered hole portion 33c (see a solid line in FIG. 2).

The float 32 is formed of a material having a smaller specific gravity than a liquid to be filtered (in this case, hydraulic oil). The float 32 therefore floats on the hydraulic oil.

FIG. 1 will be described again. The air vent portion 30 is provided in the lid member 14 such that a lower end surface 31c of the main body portion 31 is positioned above a lower surface 14a of the lid member 14 (i.e., the interior space S1). This causes air contained in the hydraulic oil to be trapped in a space S2 formed over the interior space S1, allowing the float 32 to be easily pushed up by the air trapped in the space S2.

An air vent hole 12b is formed in the second tubular case 12, and an air vent hole 14b is formed in the lid member 14. The air vent hole 14b includes a first end open into the air vent hole 33 (in this case, a hole 33e) and a second end open into the air vent hole 12b. The air vent hole 12b includes a first end open into the air vent hole 14b and a second end open toward outside of the filter case 10 (in this case, inside of the tank). The air vent hole 33, the air vent hole 14b, and the air vent hole 12b allow the interior space S1 to communicate with an exterior space of the filter case 10.

Now, the functionality of the return filter 1 thus configured will be described. Arrows in FIG. 1 indicate flows of the hydraulic oil in the return filter 1.

The hydraulic oil having flowed in through the inflow hole 12a flows into the interior space S1. The hydraulic oil having flowed in flows downward while swirling. A swirling flow occurring in the hydraulic oil causes small bubbles included in the hydraulic oil to be collected in a center portion of the swirling flow, generating large bubbles B. The bubbles B float toward the oil surface L. Thus, the air contained in the liquid can be efficiently removed. In particular, in the present embodiment, the bubbles B are generated in the vicinity of the oil surface L and can thus efficiently reach the oil surface L.

The hydraulic oil thus free from the bubbles further flows downward and into the space between the filter case 10 and the filter element 20. The hydraulic oil flows from an outer side toward an inner side of the filter element 20. The filtered hydraulic oil flows into an inner side of the inner tube 21. The filtered hydraulic oil flows out into the tank through the outflow pipe 41.

On the other hand, the bubbles B floating toward the oil surface L disappear at the oil surface and are trapped in the space S2 and in the upper section of the interior space S1. The air trapped in the space S2 and in the upper section of the interior space S1 pushes up the float 32.

Figure 3:
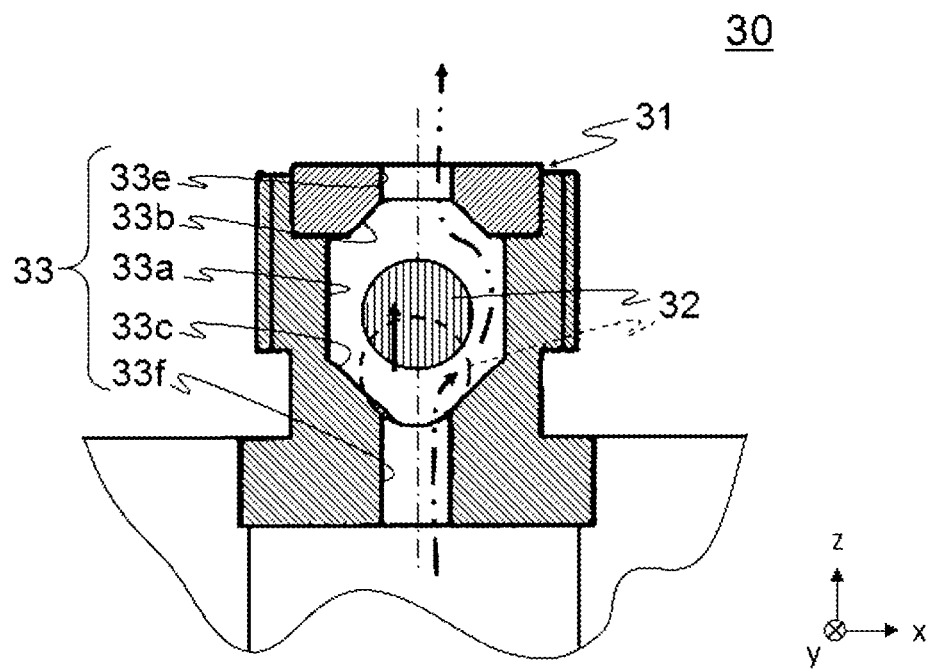
FIG. 3 is a diagram illustrating the air vent portion 30 in a state where a float 32 is pushed up by air.

FIG. 3 is a diagram illustrating the air vent portion 30 in a state where the float 32 is pushed up by air. The float 32 is normally in abutting contact with the lower end of the second tapered hole portion 33c under the weight of the float 32 (see a dashed line in FIG. 3) to occlude the air vent hole 33. When pushed up, the float 32 moves upward from the lower end of the second tapered hole portion 33c toward the hole main body portion 33a. As a result, a passage of air is formed inside the air vent hole 33, and air passes through the air vent hole 33 as illustrated by an alternate long and two short dashes line in FIG. 3.

When the air is discharged, the float 32 returns to the position where the float 32 is in abutting contact with the lower end of the second tapered hole portion 33c. Since the float 32 is of a substantially spherical shape, the float 32 comes into abutting contact with the second tapered hole portion 33c along an annular line. Furthermore, the float 32 and the second tapered hole portion 33c come into close contact with each other at a position corresponding to the diameters of the float 32 and the second tapered hole portion 33c. As a result, the float 32 firmly occludes the air vent hole 33 (the lower end of the second tapered hole portion 33c). Therefore, when, e.g., the engine is stopped, air is prevented from flowing backward to the interior space S1 through the air vent hole 33.

Figure 4:
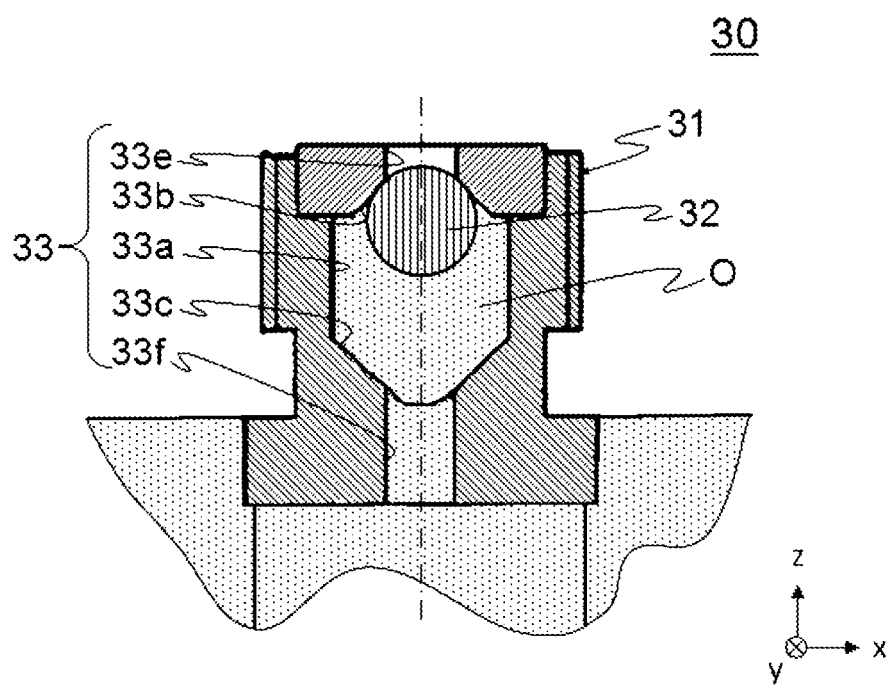
FIG. 4 is a diagram illustrating the air vent portion 30 in a state where an interior space S1 and a space S2 are filled with hydraulic oil.

When all of the air trapped in the interior space S1 and in the space S2 is discharged, the interior space S1 and the space S2 may be filled with oil. FIG. 4 is a diagram illustrating the air vent portion 30 in a state where the interior space S1 and the space S2 are filled with hydraulic oil O.

The hydraulic oil O flows into the air vent hole 33 through the interior space S1 and the space S2. The float 32 floats on the hydraulic oil O and is thus pushed up by the hydraulic oil O to rise along with rise of the oil surface. The float 32 then comes into abutting contact with the upper end of the first tapered hole portion 33b. Since the float 32 is of a substantially spherical shape, the float 32 comes into abutting contact with the first tapered hole portion 33b along an annular line. Furthermore, the float 32 and the first tapered hole portion 33b come into close contact with each other at a position corresponding to the diameters of the float 32 and the first tapered hole portion 33b. As a result, the float 32 firmly occludes the air vent hole 33 (the upper end of the first tapered hole portion 33b). This allows the hydraulic oil O to be prevented from flowing out of the filter device.

According to the present embodiment, the first tapered hole portion 33b is formed on the upper side of (on the +z side of) the hole main body portion 33a, the second tapered hole portion 33c is formed on the lower side of (on the −z side of) the hole main body portion 33a, and the float 32 is inserted into the space formed by the hole main body portion 33a, the first tapered hole portion 33b, and the second tapered hole portion 33c such that the float 32 is movable between the upper end of the first tapered hole portion 33b and the lower end of the second tapered hole portion 33c. The float 32 is then pushed up by air to float from the position where the float 32 is in abutting contact with the lower end of the second tapered hole portion 33c. This allows the air trapped in the filter device to be discharged through the air vent hole 33.

Furthermore, according to the present embodiment, unless the float 32 is pushed up by air, the substantially spherical shaped float 32 firmly covers the lower end of the second tapered hole portion 33c (air vent hole 33). This allows air to be prevented from flowing backward through the air vent hole 33. Moreover, since the float 32 floats on the hydraulic oil, the float 32 rises along with rise of the oil surface to firmly cover the upper end of the first tapered hole portion 33b (air vent hole 33). This allows the hydraulic oil to be prevented from flowing out of the filter device through the air vent hole 33.

Furthermore, according to the present embodiment, the float 32, which is of a substantially spherical shape, comes into close contact with the first tapered hole portion 33b or the second tapered hole portion 33c. This allows the float 32 to firmly occlude the first tapered hole portion 33b or the second tapered hole portion 33c.

Note that, in the present embodiment, the air vent portion 30 is provided in the lid member 14 such that the lower end surface 31c of the main body portion 31 is positioned above the lower surface 14a of the lid member 14 (see FIG. 1) but that the position of the air vent portion 30 is not limited to this. For example, the space S2 may be eliminated and the lower end surface 31c of the main body portion 31 may be substantially flush with the lower surface 14a of the lid member 14. Alternatively, for example, the lower end surface 31c of the main body portion 31 may be located below the lower surface 14a of the lid member 14.

Figure 5:
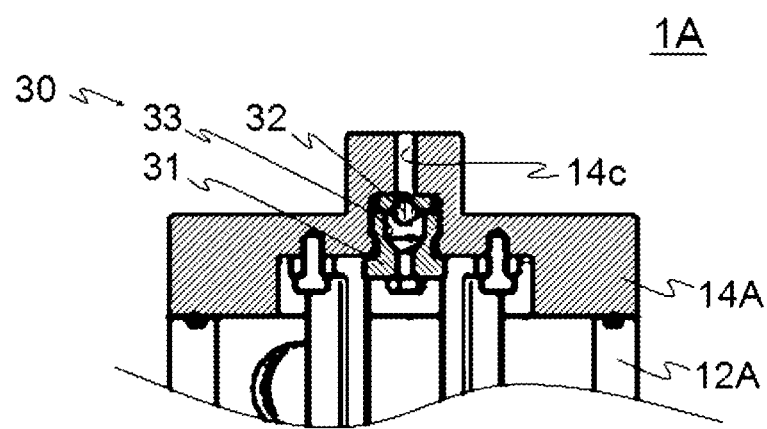
FIG. 5 is a cross-sectional view schematically illustrating a return filter 1A according to a modified example.

Furthermore, in the present embodiment, the air vent hole 33, the air vent hole 14b, and the air vent hole 12b allow the interior space S1 to communicate with the inside of the tank. However, the air vent hole 33, the air vent hole 14b, and the air vent hole 12b may allow the interior space S1 to communicate with the outside of the filter case 10. FIG. 5 is a cross-sectional view schematically illustrating a return filter 1A according to a modified example. For example, as illustrated in FIG. 5, no air vent hole may be formed in the second tubular case 12A, and the air vent hole 14c may penetrate the lid member 14A in the z direction. In particular, in the present embodiment, the float 32 covers the upper end of the air vent hole 33 to prevent the hydraulic oil from flowing out of the filter device through the air vent hole 33. This eliminates a need to form the air vent hole such that one end of the air vent hole is open into the tank. The present invention is therefore suitable for application to various filter devices other than return filters.

Furthermore, in the present embodiment, the float 32 is formed of the material floating on the hydraulic oil. However, in a case where the float 32 is formed of a material having a larger specific gravity than the hydraulic oil, the present embodiment can be applied to a strainer.

Figure 6:
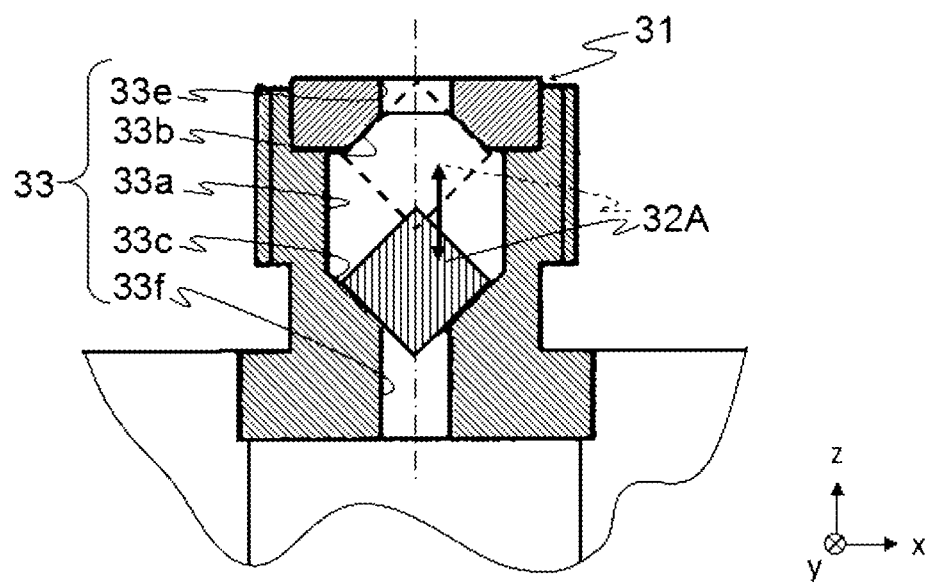
FIG. 6 is a cross-sectional view illustrating details of an air vent portion 30A.

Additionally, in the present embodiment, the float 32 is of a substantially spherical shaped. However, the shape of the float is not limited to this. FIG. 6 is a cross-sectional view illustrating details of an air vent portion 30A according to a modified example. The air vent portion 30A includes the main body portion 31 provided with the air vent hole 33, and a float 32A. The float 32A is substantially truncated conical, and a vertex angle of the truncated conical section is substantially identical to the taper angle of the first tapered hole portion 33b and the second tapered hole portion 33c. The first tapered hole portion 33b or the second tapered hole portion 33c therefore comes into abutting surface contact with the float 32A to allow the float 32A to firmly occlude the first tapered hole portion 33b or the second tapered hole portion 33c. Note that the float 32A is substantially truncated conical but that a float including a cylindrical section between two truncated cone shapes may be used for the air vent portion 30A.

Second Embodiment

In the first embodiment of the present invention, the first tapered hole portion 33b and the second tapered hole portion 33c are occluded by the substantially spherical shaped float 32. However, the shape of the air vent hole is not limited to this.

In a second embodiment of the present invention, the air vent hole is not tapered. Note that a difference between the return filter 1 according to the first embodiment and a return filter according to the second embodiment lies only in the air vent portion, and thus, for the return filter according to the second embodiment, only an air vent portion 30B will be described, with description of the other components omitted. Furthermore, components of the air vent portion 30B identical to corresponding components in the first embodiment are denoted by identical reference numerals, and detailed description of the components is omitted.

Figure 7:
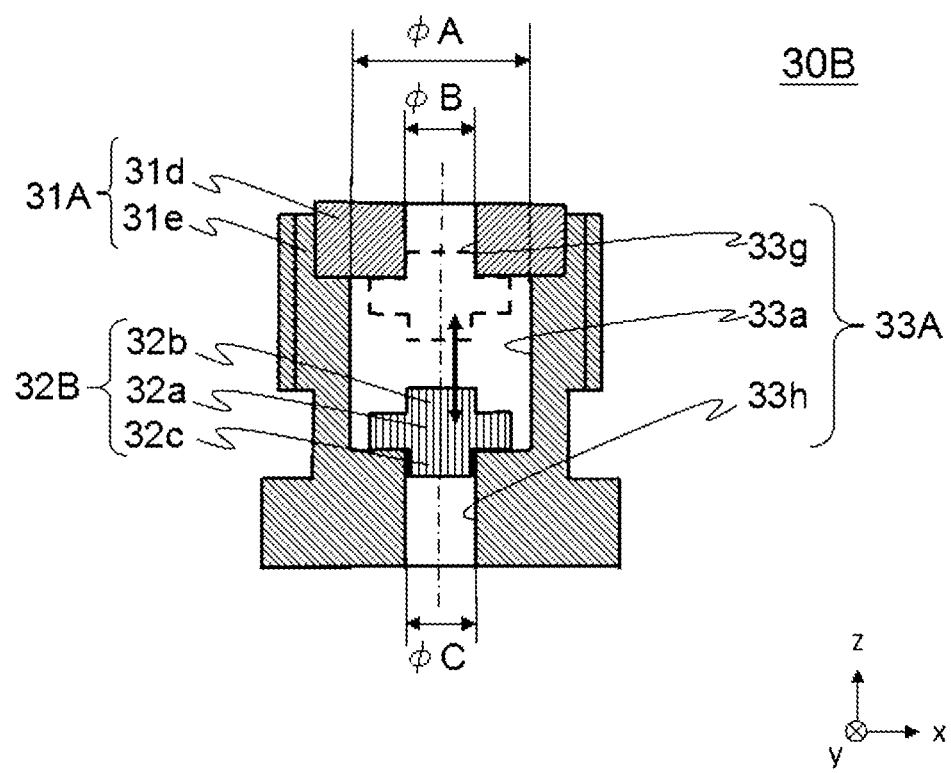
FIG. 7 is a cross-sectional view illustrating details of an air vent portion 30B.

FIG. 7 is a cross-sectional view illustrating details of the air vent portion 30B. The air vent portion 30B includes a main body portion 31A provided with an air vent hole 33A, and a float 32B.

The main body portion 31A is a substantially cylindrical component formed by integrating two components 31d and 31e together to form the air vent hole 33A. A difference between the main body portion 31 and the main body portion 31A lies only in the shape of the air vent hole 33A formed inside the main body portion 31A.

The air vent hole 33A includes the hole main body portion 33a, a first pore portion 33g, and a second pore portion 33h. The first pore portion 33g and the second pore portion 33h are substantially columnar holes. The first pore portion 33g has the diameter $\phi B$, and the second pore portion 33h has the diameter $\phi C$. That is, each of the first pore portion 33g and the second pore portion 33h has, in a cross section of the pore portion substantially orthogonal to the z direction, a cross-sectional area smaller than a cross-sectional area of the hole main body portion 33a in a cross section of the portion 33a substantially orthogonal to the z direction. The first pore portion 33g is formed on the upper side of (on the +z side of) the hole main body portion 33a, and the second pore portion 33h is formed on the lower side of (on the −z side of) the hole main body portion 33a.

The float 32B is inserted into the air vent hole 33A, specifically, into the hole main body portion 33a. The float 32B includes a plate-shaped portion 32a and protruding portions 32b and 32c formed on respective end surfaces of the plate-shaped portion 32a. The plate-shaped portion 32a has the diameter $\phi A$ larger than each of $\phi B$ and $\phi C$. Furthermore, the protruding portion 32b has a diameter smaller than $\phi B$, and the protruding portion 32c has a diameter smaller than $\phi C$.

The float 32B is normally in abutting contact with a lower end of the hole main body portion 33a (see a solid line in FIG. 7) to occlude the air vent hole 33A (i.e., an upper end of the second pore portion 33h). When the float 32B pushed up, the float 32B moves upward from the lower end of the hole main body portion 33a toward the hole main body portion 33a. As a result, a passage of air is formed inside the air vent hole 33A.

When the air is discharged, the float 32B returns to the position where the float 32B covers a bottom surface of the hole main body portion 33a, i.e., an upper end of the second pore portion 33h. Therefore, when, e.g., the engine is stopped, air is prevented from flowing backward to the interior space S1 through the air vent hole 33A.

When the interior space S1 and the space S2 are filled with hydraulic oil and the hydraulic oil flows into the air vent hole 33A through the interior space S1 and the space S2, the float 32B rises along with rise of the oil surface. The float 32B comes into abutting contact with an upper surface of the hole main body portion 33a to cover a lower end of the first pore portion 33g, thus preventing the hydraulic oil from flowing out of the filter device through the air vent hole 33A.

According to the present embodiment, the float 32B is movable in the up-down direction between the position where the float 32B covers the upper end of the second pore portion 33h and the position where the float 32B covers the lower end of the first pore portion 33g. The float 32B is pushed up by air to float from the position where the float 32B is in abutting contact with the bottom surface of the hole main body portion 33a. This allows the air trapped in the filter device to be discharged through the air vent hole 33A. Furthermore, unless the float 32B is pushed up by air, the float 32B covers the upper end of the second pore portion 33h. This allows air to be prevented from flowing backward through the air vent hole 33A. Moreover, since the float 32B floats on the hydraulic oil, the float 32B rises along with rise of the oil surface to cover the lower end of the first pore portion 33g. This allows the hydraulic oil to be prevented from flowing out of the filter device through the air vent hole 33A.

Third Embodiment

In the first embodiment of the present invention, the first tapered hole portion 33b and the second tapered hole portion 33c are occluded by the substantially spherical shaped float 32. However, the shape of the first tapered hole portion 33b and the second tapered hole portion 33c is not limited to this.

In the third embodiment of the present invention, steps are formed in each the first tapered hole portion 33b and the second tapered hole portion 33c. Note that a difference between the return filter 1 according to the first embodiment and a return filter according to the third embodiment lies only in the air vent portion, and thus, for the return filter according to the third embodiment, only an air vent portion 30C will be described, with description of the other components omitted. Furthermore, components of the air vent portion 30C identical to corresponding components in the first embodiment are denoted by identical reference numerals, and detailed description of the components is omitted.

Figure 8:
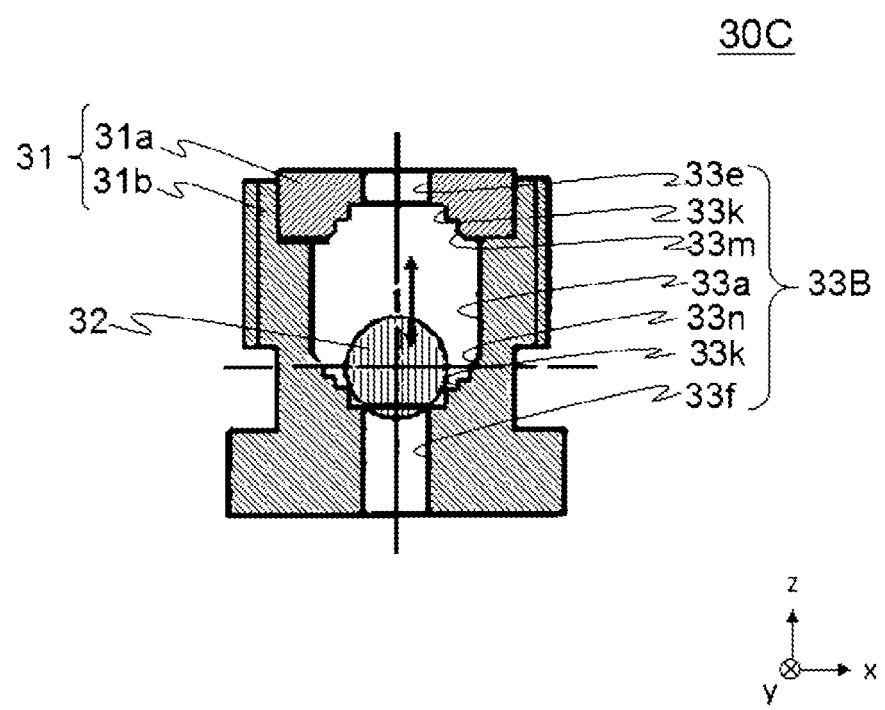
FIG. 8 is a cross-sectional view illustrating details of an air vent portion 30C.

FIG. 8 is a cross-sectional view illustrating details of the air vent portion 30C. In the air vent portion 30C, an air vent hole 33B is formed in the main body portion 31. The air vent hole 33B includes the hole main body portion 33a, a first tapered hole portion 33m, and a second tapered hole portion 33n.

A difference between the first tapered hole portion 33*b* and the first tapered hole portion 33*m* and a difference between the second tapered hole portion 33*c* and the second tapered hole portion 33*n* lie in that steps 33*k* are formed in each of the first tapered hole portion 33*m* and the second tapered hole portion 33*n*.

The steps 33*k* are annular steps recessed outward in the radial direction. The plurality of steps 33*k* are formed in each the first tapered hole portion 33*m* and the second tapered hole portion 33*n*. Since the steps 33*k* are annular and the float 32 is of a substantially spherical shape, the float 32 comes into abutting contact with the first tapered hole portion 33*m* along an annular line, and the float 32 comes into abutting contact with the second tapered hole portion 33*n* along an annular line.

Note that the shape, number, and positions of the steps 33*k* are not limited to the shape, number, and positions illustrated in FIG. 8. For example, at least one step 33*k* may be formed in each of the first tapered hole portion 33*m* and the second tapered hole portion 33*n*. Furthermore, for example, the steps 33*k* may not be annular.

The float 32 is normally in abutting contact with a lower end of the second tapered hole portion 33*n* by the own weight of the float 32 to occlude the air vent hole 33. When the float 32 pushed up, the float 32 moves upward. As a result, a passage of air is formed inside the air vent hole 33B. When the air is discharged, the float 32 returns to the position where the float 32 is in abutting contact with the lower end of the second tapered hole portion 33*n*. Since the float 32 comes into abutting contact with the first tapered hole portion 33*m* along the annular line, the float 32 comes into close contact with the second tapered hole portion 33*n*.

When the hydraulic oil flows into the air vent hole 33B through the hole 33*f*, the float 32 rises along with rise of the oil surface and comes into abutting contact with an upper end of the first tapered hole portion 33*m*. Since the float 32 comes into abutting contact with the second tapered hole portion 33*n* along the annular line, the float 32 comes into close contact with the first tapered hole portion 33*m*.

According to the present embodiment, the steps 33*k* are formed in each of the first tapered hole portion 33*m* and the second tapered hole portion 33*n*. This allows the float 32 to be prevented from being stuck to the first tapered hole portion 33*m* or the second tapered hole portion 33*n*. For example, when the float 32 comes into close contact with the first tapered hole portion 33*m* while the first tapered hole portion 33*m* is slightly wet with the hydraulic oil, the float 32 may stick to the first tapered hole portion 33*m* and may not lower in spite of lowering of the oil surface (the float 32 fails to follow the oil surface). In contrast, the steps 33*k* formed in each tapered hole portion serve as an oil thrower, allowing the float 32 to follow the oil surface.

Note that, in the present embodiment, the steps 33*k* are formed in each of the first tapered hole portion 33*m* and the second tapered hole portion 33*n* but that the steps 33*k* may not be formed in the second tapered hole portion 33*n*. The steps 33*k* may be formed at least in the first tapered hole portion 33*m*. Furthermore, the steps 33*k* may not be annular but are desirably annular to allow the hydraulic oil to be more efficiently thrown off.

Fourth Embodiment

In the second embodiment of the present invention, the air vent hole is not tapered. Even in such a case, the float is desirably allowed to easily follow the oil surface.

In a fourth embodiment of the present invention, a recessed portion is formed at a boundary section between the hole main body portion and the first pore portion and at a boundary section between the hole main body portion and the second pore portion. Note that a difference between the return filter 2 according to the second embodiment and a return filter according to the fourth embodiment lies only in the air vent portion, and thus, for the return filter according to the fourth embodiment, only an air vent portion 30D will be described, with description of the other components omitted. Furthermore, components of the air vent portion 30D identical to corresponding components in the third embodiment are denoted by identical reference numerals, and detailed description of the components is omitted.

Figure 9:
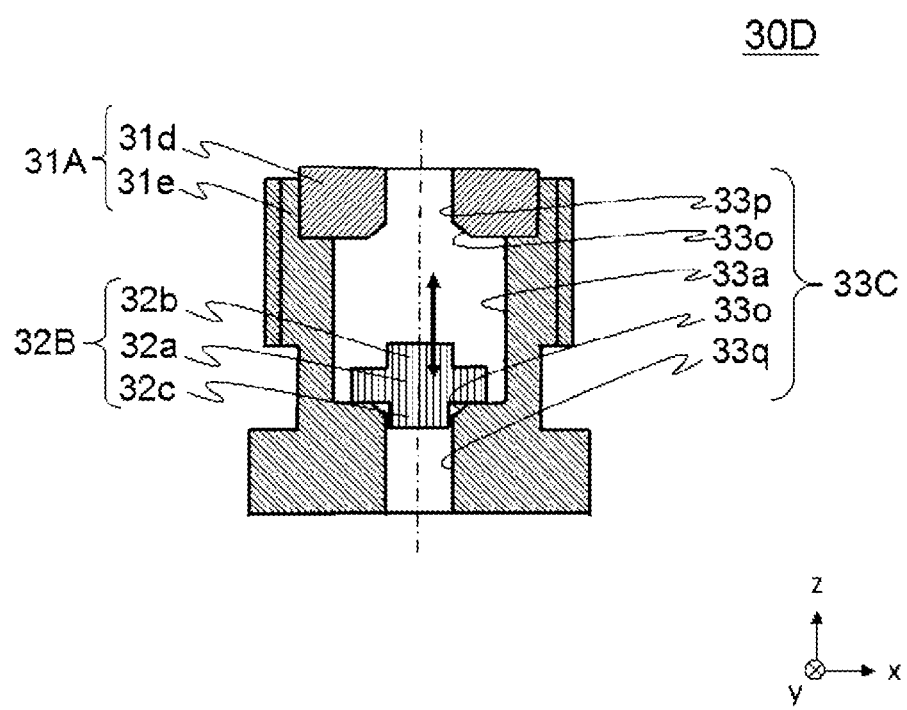
FIG. 9 is a cross-sectional view illustrating details of an air vent portion 30D.

FIG. 9 is a cross-sectional view illustrating details of the air vent portion 30D. In the air vent portion 30D, an air vent hole 33C is formed in the main body portion 31A. The air vent hole 33C includes the hole main body portion 33*a*, a first pore portion 33*p*, and a second pore portion 33*q*.

A difference between the first pore portion 33*g* and the first pore portion 33*p* and a difference between the second pore portion 33*h* and the second pore portion 33*q* lie in that a recessed portion 33*o* is formed in each of the first pore portion 33*p* and the second pore portion 33*q*. The recessed portion 33*o* is an annular chamfer. The recessed portion 33*o* is formed at each of a lower end of the first pore portion 33*p* and an upper end of the second pore portion 33*q*.

Note that the size of the recessed portion 33*o* is not limited to the size illustrated in FIG. 9. For example, the size of the recessed portion 33*o* may be larger than the size illustrated in FIG. 9. Furthermore, the annular chamfer is synonymous with the tapered hole portion. In other words, the lower end of the first pore portion 33*p* may be provided with a tapered hole portion formed to have a diameter gradually decreasing upward. The upper end of the second pore portion 33*q* may be provided with a tapered hole portion formed to have a diameter gradually decreasing downward. Furthermore, the recessed portion 33O may not be annular.

The float 32B is normally in abutting contact with the lower end of the hole main body portion 33*a*. When the float 32B pushed up, the float 32B moves upward from the lower end of the hole main body portion 33*a* toward the hole main body portion 33*a*. As a result, a passage of air is formed inside the air vent hole 33C. When the air is discharged, the float 32B returns to the position where the float 32B covers the bottom surface of the hole main body portion 33*a*, i.e., an upper end of the second pore portion 33*q*.

When the hydraulic oil flows into the air vent hole 33C through the second pore portion 33*q*, the float 32B rises along with rise of the oil surface and comes into abutting contact with the upper surface of the hole main body portion 33*a* to cover the lower end of the first pore portion 33*p*. This prevents the hydraulic oil from flowing out of the filter device through the air vent hole 33C.

According to the present embodiment, the recessed portion 33*o* is formed at each of the lower end of the first pore portion 33*p* and the upper end of the second pore portion 33*q*. This allows the float 32B to be prevented from being stuck to the inside of the air vent hole 33C. For example, when the float 32B comes into close contact with the upper surface of the hole main body portion 33*a* while the inside of the air vent hole 33C is slightly wet with the hydraulic oil, the float 32B may stick to the upper surface of the hole main body portion 33*a* and may fail to follow the oil surface. In contrast, the recessed portion 33*o* formed in each pore portion reduces the area of the contact section between the float 32B and the upper surface of the hole main body portion 33a, facilitating separation of the float 32B from the upper surface of the hole main body portion 33a.

Figure 10:
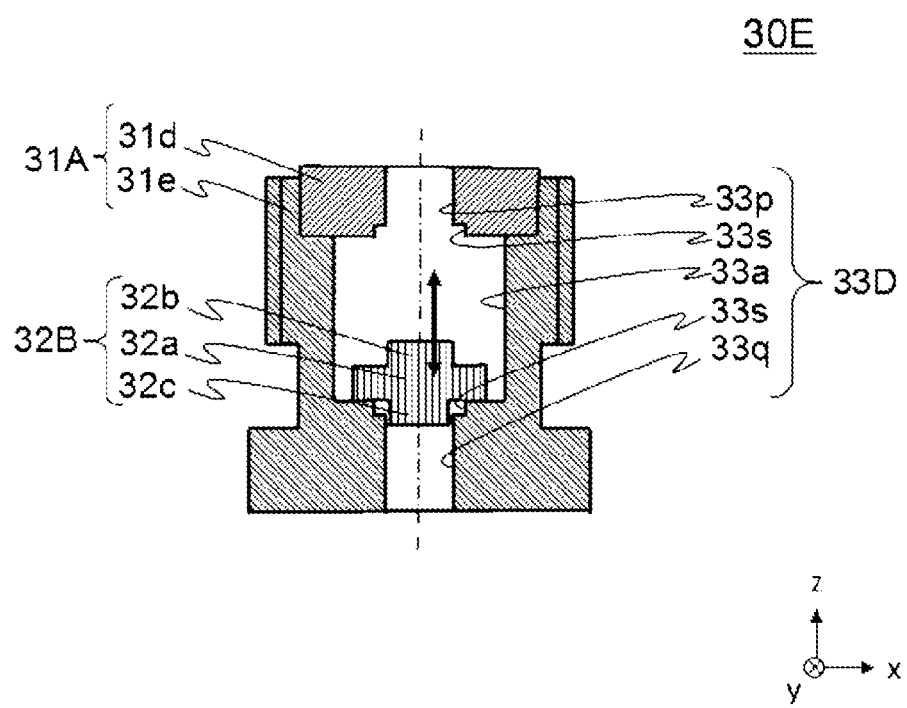
FIG. 10 is a cross-sectional view illustrating details of an air vent portion 30E.

Note that, in the present embodiment, the recessed portion 33o, which is an annular chamfer, is formed at each of the lower end of the first pore portion 33p and the upper end of the second pore portion 33q but that the shape of the recessed portion 33o is not limited to this. FIG. 10 is a cross-sectional view illustrating details of an air vent portion 30E according to a modified example. In the air vent portion 30E, the air vent hole 33C is formed in the main body portion 31A.

In the air vent hole 33C, a recessed portion 33s is formed at the lower end of the first pore portion 33p and at the upper end of the second pore portion 33q. The recessed portion 33s is an annular step recessed outward in the radial direction. Note that the recessed portion 33s may not be annular.

Furthermore, in the present embodiment, the recessed portion 33o or the recessed portion 33s is formed at each of the lower end of the first pore portion 33p and the upper end of the second pore portion 33q. However, the upper end of the second pore portion 33q may not be provided with the recessed portion 33o or the recessed portion 33s. At least the lower end of the first pore portion 33p may be provided with the recessed portion 33o or the recessed portion 33s.

Embodiments of the invention have been described in detail with reference to the drawings; however, specific configurations are not limited to the embodiments, and changes in the design or the like are also included within a scope which does not depart from the gist of the invention. For example, the above examples have been explained in detail in order to facilitate understanding of the present invention and are not necessarily limited to examples provided with the entirety of the configuration described above. In addition, the configuration of an embodiment may be partially replaced with the configuration of a different embodiment, or the configuration of the different embodiment may be added to, deleted from, or replaced with the configuration of the embodiment.

Furthermore, the term "substantially" in the present invention is not to be understood as merely being strictly the same, and is a concept that includes variations and modifications to an extent that does not result in loss in identity. For example, the term "substantially orthogonal" is not limited to being strictly orthogonal, and is a concept that includes variations of several degrees, for example. Furthermore, simple expressions such as orthogonal, parallel, and identical are not to be understood as merely being strictly orthogonal, parallel, identical, and the like, and include being substantially parallel, substantially orthogonal, substantially matching, and the like.

Furthermore, the meaning of the term "vicinity" in the present invention includes a region of a range (which can be determined as desired) near a position serving as a reference. For example, the term "a vicinity of an end" refers to a region of a range near the end, and is a concept indicating that the end may or may not be included.

REFERENCE SIGNS LIST 1, 1A Return filter
10 Filter case
11 First tubular case
12, 12A Second tubular case
12a Inflow hole
12b Air vent hole
13 Bottom surface member
14, 14A Lid member
14a Lower surface
14b, 14c Air vent hole
20 Filter element
21 Inner tube
22 Filtration material
23 Outer tube
24, 25 Plate
26 Valve
30, 30A, 30B, 30C, 30D, 30E Air vent portion
31, 31A Main body portion
31a, 31b, 31d, 31e Component
31c Lower end surface
32, 32A, 32B Float
32a Plate-shaped portion
32b, 32c Protruding portion
33, 33A, 33B, 33C Air vent hole
33a Hole main body portion
33b, 33m First tapered hole portion
33c, 33n Second tapered hole portion
33e, 33f Hole
33g, 33p First pore portion
33h, 33q Second pore portion
33k Step
33o, 33s Recessed portion
41 Outflow pipe
42 Attachment member
43 Elastic member
100 Hydraulic oil tank

The invention claimed is:

1. An oil tank comprising a filter device, wherein the filter device is disposed inside the oil tank, and comprises:
a filter case including a substantially cylindrical side surface member, a bottom surface member covering a lower end of the side surface member, and a lid member covering an upper end of the side surface member, the filter case being internally provided with a substantially cylindrical interior space, wherein the filter case has a filter inside;
an air vent passage passing through an inside of the lid member and
an air vent portion assembled in a concavity of the lid member, the air vent portion being detachable from the lid member,
wherein the air vent portion includes:
an air vent hole allowing the interior space to communicate via the air vent passage with an exterior space of the filter case and including
a substantially columnar hole main body portion,
a first hole portion formed on the upper side of the hole main body portion and partly having, in a cross section of the first hole portion substantially orthogonal to a first direction that is a longitudinal direction of the hole main body portion, a cross-sectional area smaller than a cross-sectional area of a cross section of the hole main body portion substantially orthogonal to the first direction, and
a second hole portion formed on the lower side of the hole main body portion and partly having, in a cross section of the second hole portion substantially orthogonal to the first direction, a cross-sectional area smaller than the cross-sectional area of the cross section of the hole main body portion substantially orthogonal to the first direction; and
a float inserted into the air vent hole to be movable between a position where the float occlude the first hole portion and a position where the float occludes the second hole portion, the float being formed of a material having a smaller specific gravity than oil to be filtered, wherein:
- a minimum inner diameter of the cross section of the first hole portion is smaller than a maximum outer diameter of a cross section the float substantially orthogonal to the first direction;
- a minimum inner diameter of the cross section of the second hole portion is smaller than a maximum outer diameter of a cross section the float substantially orthogonal to the first direction; and
- the float is raised by the oil in the air vent hole, wherein the concavity of the lid member comprises:
  - a first cavity disposed on a lower end surface of the lid member, the lower end surface of the lid member being abutted on the filter case;
  - a second cavity having a smaller diameter than that of the first cavity is disposed on an air flow downstream side of the first cavity;
  - an opening of the air vent passage having a smaller diameter than that of the second cavity is disposed on an air flow downstream side of the second cavity;
  - wherein the air vent portion is fitted into the second cavity; and
  - wherein the air vent portion includes a lower end surface positioned above the lower end surface of the lid member.

2. The oil tank according to claim 1, wherein
the first hole portion is a first tapered hole portion formed to have a diameter gradually decreasing upward,
the second hole portion is a second tapered hole portion formed to have a diameter gradually decreasing downward, and
the float has a substantially spherical shape having a diameter that is smaller than a diameter of the cross section of the hole main body portion substantially orthogonal to the longitudinal direction and that is larger than a diameter of a thinnest section of the first tapered hole portion and a diameter of a thinnest section of the second tapered hole portion, and the float is inserted into a space formed by the hole main body, the first tapered hole portion and the second tapered hole portion.

3. The oil tank according to claim 1, wherein
the side surface member includes an inflow hole formed in a vicinity of the lid member to cause the oil to flow from a tangential direction at any point on a side surface of the filter case into the filter case, and
the air vent portion is provided at a position including a center axis of the interior space.

4. The oil tank according to claim 2, wherein
the side surface member includes an inflow hole formed in a vicinity of the lid member to cause the oil to flow from a tangential direction at any point on a side surface of the filter case into the filter case, and
the air vent portion is provided at a position including a center axis of the interior space.

5. The oil tank according to claim 2, wherein
the air vent portion includes a lower end surface positioned above a lower surface of the lid member.

6. The oil tank according to claim 3, wherein
the air vent portion includes a lower end surface positioned above a lower surface of the lid member.

7. The oil tank according to claim 1, wherein:
the air vent portion has a columnar shape with a flanged lower end; and
an upper end of the float is not allowed to move up beyond an upper end of the air bent portion.

8. The oil tank according to claim 7, wherein:
a bottom surface of the flanged lower end is entirely flat.

* * * * *